United States Patent [19]

Seilly

[11] 4,145,625
[45] Mar. 20, 1979

[54] ELECTRO-MAGNETIC DEVICES

[75] Inventor: Alec H. Seilly, North Wembley, England

[73] Assignee: Simms Group Research & Development Limited, Birmingham, England

[21] Appl. No.: 823,011

[22] Filed: Aug. 8, 1977

Related U.S. Application Data

[63] Continuation-in-part of Ser. No. 649,735, Jan. 16, 1976, abandoned.

[30] Foreign Application Priority Data

Jan. 25, 1975 [GB] United Kingdom ................. 3351/75

[51] Int. Cl.² ........................................... H02K 33/00
[52] U.S. Cl. ....................................... 310/27; 310/80; 335/220
[58] Field of Search ...................... 310/27, 80; 335/220

[56] References Cited

U.S. PATENT DOCUMENTS 3,353,040  11/1967  Abbott ................................... 310/27

Primary Examiner—Donovan F. Duggan

[57] ABSTRACT

An electro-magnetic device comprises a first annular member and a second member having a cylindrical surface, the two members being interengaged. The presented surfaces of the two members are each provided with a two start or a multiple of a two start, thread formation thereby defining helical ribs on the two members. A winding is wound on the second member the winding arrangement being such that in the grooves or adjacent grooves the direction of current flow will be in the opposite direction when the winding is energized whereby the two members will move relative to each other to align the ribs on the members.

2 Claims, 1 Drawing Figure

U.S. Patent    Mar. 20, 1979    4,145,625
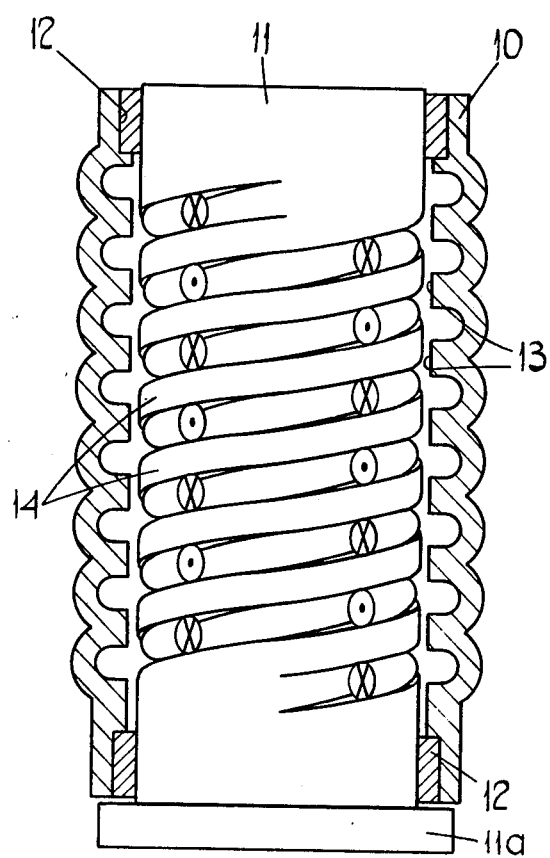

ELECTRO-MAGNETIC DEVICES

This Application is a Continuation-in-Part Application based on my Application numbered 649,735 filed Jan. 16, 1976, now abandoned.

The invention relates to an electromagnetic actuator of the kind comprising a pair of relatively movable members which are movable relative to each other in response to a magnetic field produced by the flow of electric current in a winding carried by one of the members.

In the Specification of U.S. Pat. No. 3,353,040 there is described an electrodynamic transducer particularly designed for ensonifying the ocean with audible or super-audible waves. The described transducer is provided with two relatively movable members each of annular form with one of the members being mounted within the other. The presented surfaces of the two members are provided with linings of ferromagnetic material in which are formed double helical grooves. Moreover, each member carries an electric winding, the windings being located within the grooves and in use the winding on one member is energised from a direct current source whilst the winding on the other member is energised from an alternating current source. The effect is to cause oscillatory relative movement of the two members for which purpose the transducer described in the Specification of U.S. Pat. No. 3,353,040 was designed.

The object of the present invention is to provide an electromagnetic actuator which is capable of delivering a large force over a limited range of movement in one direction only and which also is fast acting.

According to the invention an electromagnetic actuator comprises a first member of generally annular form, a second member having a cylindrical surface presented to one boundary surface of said first member, said surfaces being in spaced relationship, bearing means for guiding relative axial movement of the members, said second member in use being fixed, each of the portions of said member defining said surfaces being formed from magnetizable material, a two or a multiple of two, start helical thread formation formed of each of said surfaces, the thread formation in each surface providing two or a multiple of two helical ribs which are separated by helical grooves, and an electric winding carried by said second member, said winding when energised causing said ribs or adjacent ribs on said second member to be oppositely magnetically polarized, whereby the first member will be subject to magnetic forces acting to move the ribs on the members into alignment.

One example of an electro-magnetic actuator in accordance with the invention will now be described with reference to the accompanying drawing which is a part sectional side view through the actuator.

Referring to the drawing, there is provided a first member 10 which is of generally annular form, and a second member 11 which is housed within the first member and which has a generally cylindrical peripheral surface. The member 11 may itself be of annular form or it may be solid. Both members are formed from magnetisable material, and it is arranged that the internal peripheral surface of the member 10 and the peripheral surface of the member 11 are disposed in spaced relationship with the gap between the aforesaid surfaces being as small as possible. As will be seen from the drawing, the member 10 at its opposite ends, mounts a pair of bearing bushes 12 which serve to guide the relative movement of the member 11. In use, the member 11 is held against movement by the fact that it is secured to a support 11a and the member 10 is connected in a manner not shown to a mechanism or component of which it is required to move.

Formed on the peripheral surface of the member 11 and also on the internal peripheral surface of the member 10 is a two start helical thread formation which defines two helical ribs 13 on the member 10 and two helical ribs 14 on the member 11 respectively. The grooves which are defined between the ribs 14 carry portions of an electrical winding in the example, this being a single turn winding. The winding is wound from one end of the member 11 in one of the grooves, and back towards the same end of the member along the other groove. It will thus be seen that the connections to the winding are at the same end of the member, and when electric current is passed through the winding, the direction of current flow in the two grooves will be in the opposite direction. The flow of electric current effects magnetisation of the ribs 14, and the ribs will be of opposite magnetic polarity. The magnetic circuit between the ribs 14 is completed through the ribs 13 of the member 10, and also through the small air gaps which exist between the ribs 13 and 14.

As mentioned, the member 11 is fixed and the member 10 is initially positioned so that the ribs 13, 14 of the two members are out of line. The effect of the magnetic flux is to cause axial movement of the member 10 in the downward direction as seen in the drawing, so as to reduce the reluctance of the magnetic circuit, and the effect of such movement is to bring the ribs 13, 14 into alignment with each other.

In the example described, a two start thread formation is provided on each of the members. However, a multiple of a two start thread formation can be provided, and the winding wound appropriately, it being appreciated that it is essential that the directions of current flow in the portions of the windings in adjacent portions of the grooves should be opposite.

It will of course be appreciated that the outer member 10 could be fixed in which case the winding would be disposed within the grooves on the outer member so as to avoid the necessity of providing flexible leads to convey the electric current to the windings.

As will be seen from the drawing, the outer periphery of the outer member 10 is shaped to minimise the mass of the material forming the member. This is to ensure that the member moves quickly in response to the flow of electric current. It will be appreciated that the section of the outer member must be sufficient to be able to carry the magnetic flux without magnetic saturation of the material taking place. The shaping is effected by an external thread formation.

I claim:

1. An electromagnetic actuator comprising a first member of generally annular form, a second member having a cylindrical surface presented to one boundary surface of said first member, said surfaces being in spaced relationship, bearing means for guiding relative axial movement of the members, said second member in use being fixed, each of the portions of said members defining said surfaces being formed from magnetizable material, a two or a multiple of two, start helical thread formation formed in each of said surfaces, the thread formation in each surface providing two or a multiple of two helical ribs which are separated by helical grooves, and an electric winding carried by said second member, said winding when energized caused said ribs or adjacent ribs on said second member to be oppositely magnetically polarized, whereby the first member will be subject to magnetic forces acting to move the ribs on the members into alignment, the surface of the first member opposite to the surface bearing the thread formation being shaped by a further thread formation to reduce the section of the first member to permit rapid movement thereof under the action of the magnetic field.

2. An electromagnetic actuator according to claim 1 in which said bearing means comprises a pair of bushes carried by the second member in spaced relationship thereon.

* * * * *